United States Patent [19]

Walker et al.

[11] Patent Number: 4,595,436
[45] Date of Patent: Jun. 17, 1986

[54] METHOD FOR APPLYING POLYURETHANE BACKING

[75] Inventors: Paul Walker, 2606 W. Lake Park, Rocky Face, Ga. 30740; Glen F. Hamrick, 3200 Summer Rd., Tunnel Hill, Ga. 30755; B. Lamar Sosebee, Resaca, Ga.

[73] Assignees: Paul Walker, Rocky Face; Glen F. Hamrick, Tunnel Hill, both of Ga.

[21] Appl. No.: 646,415

[22] Filed: Aug. 31, 1984

Related U.S. Application Data

[63] Continuation-in-part of Ser. No. 554,210, Nov. 22, 1983, Pat. No. 4,515,646.

[51] Int. Cl.$^4$ .................. B32B 5/20; B32B 31/22; B32B 31/26
[52] U.S. Cl. ........................ 156/79; 156/85; 156/164; 156/209; 156/324
[58] Field of Search .............. 156/79, 85, 164, 209, 156/324, 78; 427/244, 373

[56] References Cited

U.S. PATENT DOCUMENTS

| | | | |
|---|---|---|---|
| 3,518,102 | 6/1970 | Mertgen et al. | 427/365 |
| 3,519,526 | 7/1970 | Carey et al. | 428/320.2 |
| 3,705,834 | 12/1972 | Terry | 427/373 |
| 3,926,700 | 12/1975 | Hopkins, Jr. et al. | 428/95 |
| 4,132,817 | 1/1979 | Tillotson | 427/244 |
| 4,171,395 | 10/1979 | Tillotson | 428/95 |
| 4,239,821 | 12/1980 | McLean et al. | 427/373 |
| 4,278,482 | 7/1981 | Poteet et al. | 156/78 |
| 4,405,393 | 9/1983 | Tillotson | 156/78 |
| 4,512,831 | 4/1985 | Tillotson | 156/78 |

Primary Examiner—Evan K. Lawrence
Attorney, Agent, or Firm—James B. Middleton

[57] ABSTRACT

A method and apparatus for making a foamed polyurethane cushion. The cushion may be a separate cushion for carpeting or other fabric, or may be bonded to carpeting. Components for forming a foamed polyurethane are cooled, and dispensed into a puddle on a moving sheet. The puddle is leveled by an air knife into a uniform coating; then, the moving sheet is passed around a roller and placed coated side down against a fabric. The resulting sandwich is held, and moved across a steam box. The steam causes the components to react and form a blown polyurethane. After the blowing is complete and before the foam is cured beyond its plastic state, the thickness of the foam is adjusted by pressing with a roller. The sheet, which is a thermoplastic, is heated to cause the sheet to blend into the completed foam.

13 Claims, 4 Drawing Figures

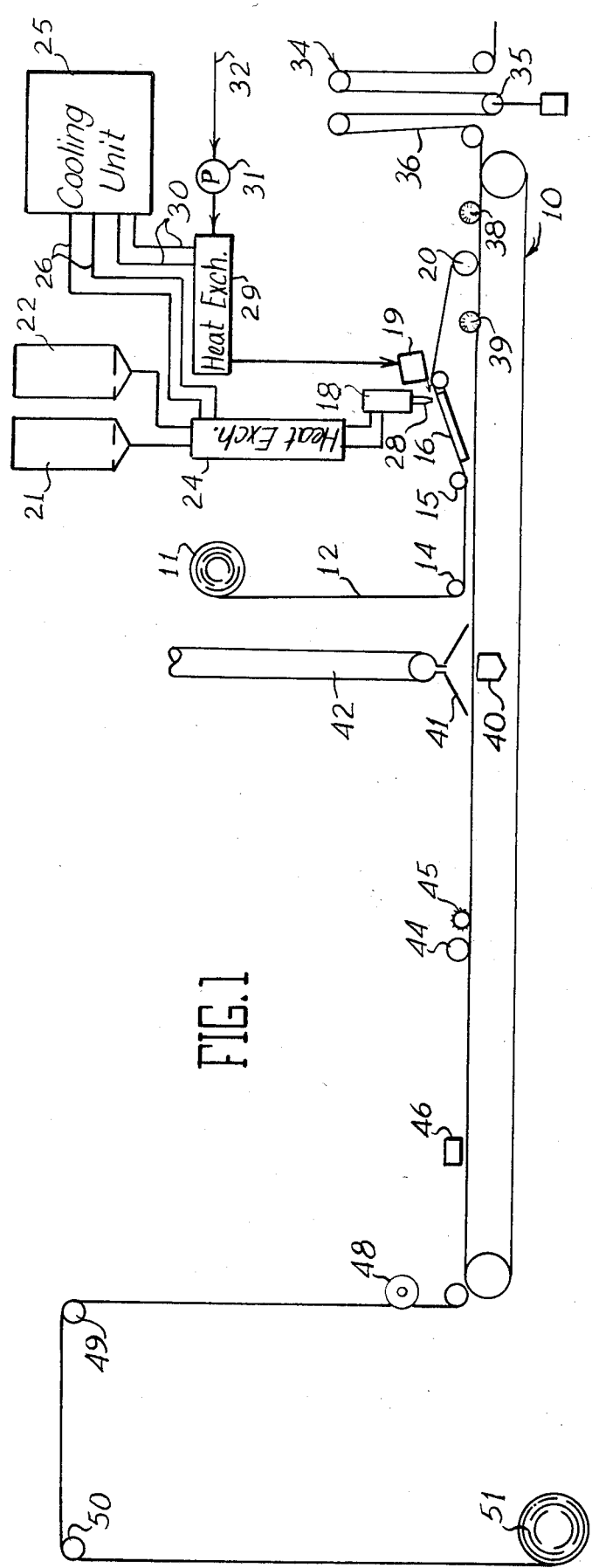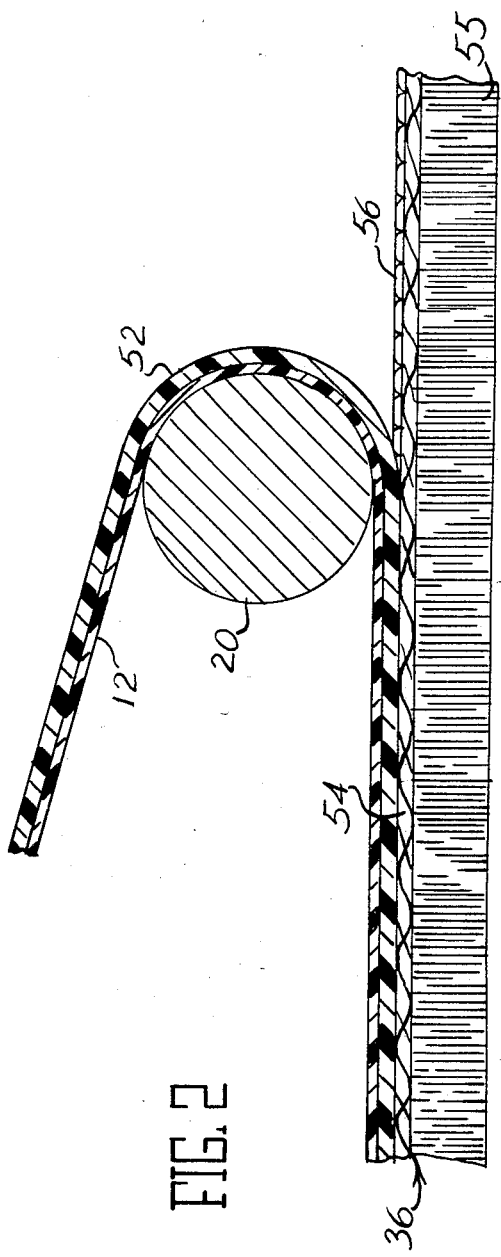
FIG.1
FIG.2

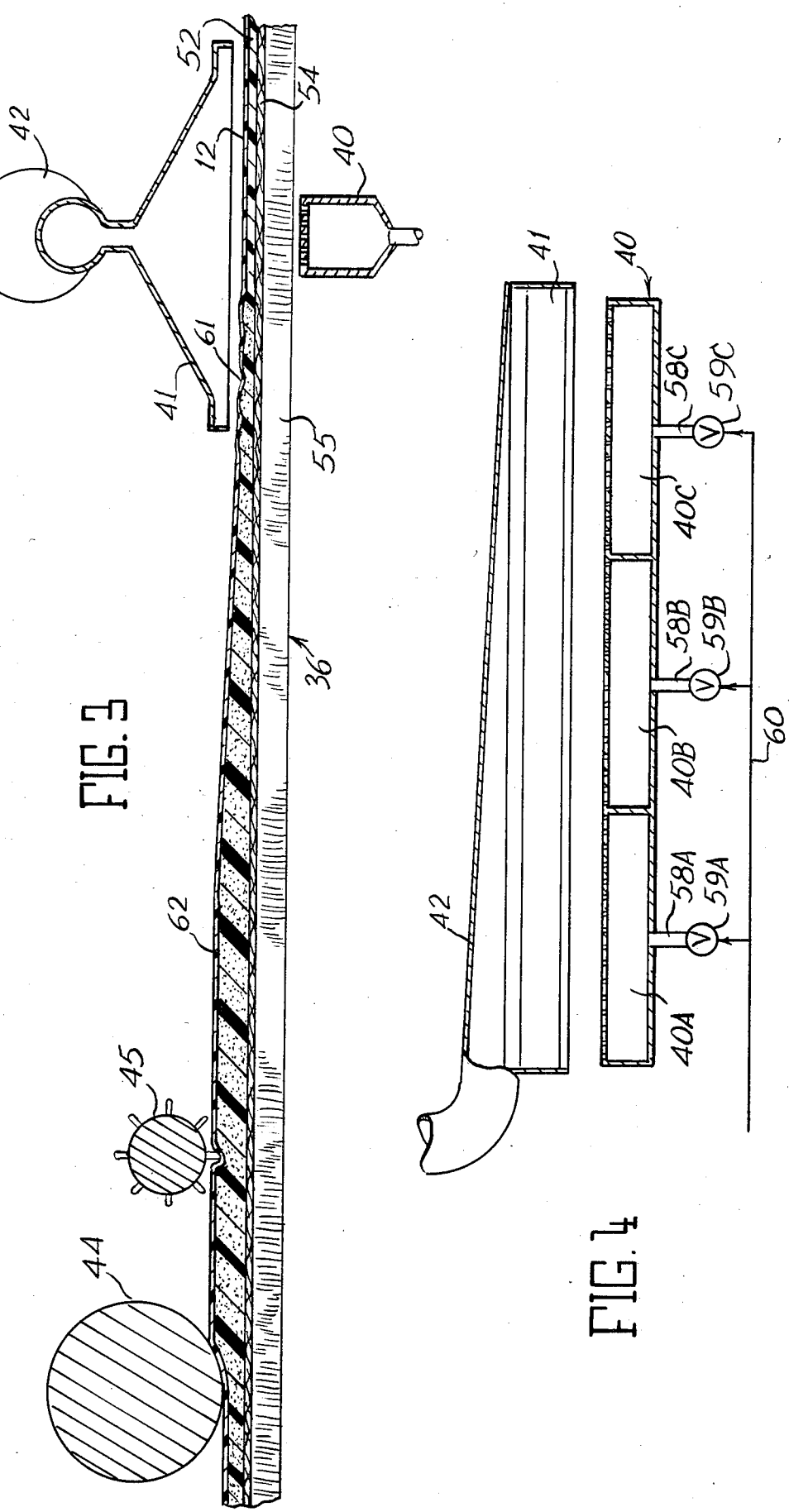

METHOD FOR APPLYING POLYURETHANE BACKING

CROSS REFERENCE TO RELATED APPLICATIONS

This application is a continuation-in-part of application Ser. No. 554,210 by the present inventors, filed Nov. 22, 1983, U.S. Pat. No. 4,515,646 and titled "Method for Applying Polyurethane Backing".

BACKGROUND OF THE INVENTION

It is well known in the art to provide a foamed cushion on carpeting and other fabrics, and to create a pad of polyurethane to be used as a separate cushion for carpeting and the like. It is also known in the art to deposit the components for forming a polyurethane onto a belt or the like, allowing the components to react to form a foamed polyurethane, and to adhere a carpet to the foam while the foam is in its tacky state prior to curing. A principal difficulty in many of the prior art systems is in the provision of means for causing the foamed polyurethane to release from the belt. Elaborate apparatus is frequently required, and the use of release agents may be utilized to allow the release.

In at least one of the prior art systems for providing the polyurethane backing for carpeting, the polyurethane components are deposited on a belt, the foaming is initiated, and the polyurethane is partially blown when the carpeting is placed against the material. The carpeting then applies its own weight, and sometimes additional weight is applied, to hold the material down during the blowing of the polyurethane material. As a result, the full blow by the polyurethane system is not allowed, and of course the additional apparatus is required for pressing the carpet against the polyurethane material during the blowing.

SUMMARY OF THE INVENTION

This invention relates to a method for providing an expanded polyurethane material bonded to a surface of sheet material.

The present invention provides a method wherein the polyurethane forming components are cooled to a low temperature, and maintained at a low temperature while the components are coated on a first sheet material. The first sheet material with the unfoamed coating is then placed down against a second sheet material below the first sheet material, the second sheet material being permeable to steam. With the two sheets of material together and the polyurethane forming components therebetween, steam is directed through the second sheet material both to add water to the polyurethane forming components and to heat the components to initiate the reaction. The components are then expanded fully, with only the first sheet material on the upper surface, allowing full expansion of the polyurethane. After blowing of the polyurethane is substantially complete, and before the polyurethane foam is completely cured, the first sheet material is depressed, deforming the foam to achieve the desired thickness. In one embodiment of the invention, the first sheet material is a thin sheet of polyethylene, and the material is completed by heating the polyethylene sufficiently that the polyethylene welds more intimately with the foamed polyurethane. The second sheet material may be tufted carpeting or the like, to provide a polyurethane backing on the carpeting; or, the second sheet material may be inexpensive woven or nonwoven fabric to yield a separate carpet padding.

BRIEF DESCRIPTION OF THE DRAWINGS

These and other features and advantages of the present invention will become apparent from consideration of the following specification when taken in conjunction with the accompanying drawings in which:

FIG. 1 is a schematic view illustrating a complete system made in accordance with the present invention;

FIG. 2 is an enlarged, longitudinal cross-sectional view showing the placing of the coated sheet against tufted carpeting;

FIG. 3 is an enlarged, longitudinal cross-sectional view showing the means for applying steam and for compressing the foam; and, FIG. 4 is a transverse cross-sectional view on a somewhat reduced scale, taken substantially along the line 4—4 in FIG. 3.

DETAILED DESCRIPTION OF THE EMBODIMENT

Referring now more particularly to the drawings, and to that embodiment of the invention here presented by way of illustration, it should first be understood that the general principles involved in the present invention are disclosed in the prior, co-pending application identified above, and that disclosure is incorporated herein by reference. In the prior application, the polyurethane components were always deposited onto a sheet that was perforate, steam was blown through the perforate material to start the reaction to form the blown polyurethane, and a second sheet was placed against the top surface of the blown polyurethane. It has now been found that excellent results can be achieved by depositing the polyurethane components onto an imperforate sheet, then inverting that sheet to place the sheet against a second sheet, the imperforate sheet then becoming the upper sheet for the system.

It should also be understood in conjunction with the following description that the materials shown by way of illustration comprise a polyurethane sheet and a tufted carpeting. It will become clear that the present invention is not limited to these particular materials; rather, the present invention readily lends itself to the use of virtually any perforate sheet material in place of the tufted carpeting, so the present invention can provide any other padded textile, and can be utilized to create a separate pad to be used in the installation of carpeting.

Looking now particularly at FIG. 1 of the drawings, a conventional tenter is designated at 10. Above the tenter 10, there is a roll 11 of a first sheet material designated at 12. The sheet material 12 is pulled from the roll 11 and directed around rollers 14 and 15. From the roller 15, the sheet material 12 passes up the inclined surface 16. A mixing apparatus 18 deposits polyurethane components onto the film 12 at the upper end of the surface 16, the liquid being leveled through use of the air knife 19. The sheet material 12 then has a uniform coating of polyurethane forming materials, and the sheet material 12 is passed around a roller 20 which inverts the sheet so that the coating on the film faces the sheet material on the tender 10.

Those skilled in the art will realize that polyurethane is formed using the primary components of a polyol and an isocyanate. In FIG. 1 there are indicated two storage tanks 21 and 22 for storing the two components. While it will be understood that there are other components utilized in the formation of a polyurethane, those skilled in the art will understand the composition, and the present invention does not include a new formulation of polyurethane. Thus, the above description should be sufficient.

Once the components of the polyurethane are mixed together, the components will begin to react when they reach a certain temperature. In the present invention, an object is to allow the reaction of components only after the sheet materials are placed together with the polyurethane components therebetween. Thus, the liquid from the tanks 21 and 22 is passed through a heat exchanger 24 where heat is removed by means of the cooling unit 25. The cooling unit 25 may be a conventional refrigeration unit or the like, the unit 25 communicating with the heat exchanger 24 through the lines 26. Thus, the components of the polyurethane will be at a low temperature, and mixed by the mixing head 18 and dispensed through the spout 28 onto the sheet material 12. Since the components are at a sufficiently low temperature, there will be no reaction and the material will remain in a liquid form.

The puddle of liquid deposited by the mixing head 18 through the spout 28 must be leveled to a uniform thickness. One means for leveling the coating to the desired thickness is to utilize an air knife, the air knife 19 directing a thin blade of air across the deposited puddle, and leaving the desired thickness of coating beneath the blade of air.

Since it is desired to continue to delay the reaction of the polyurethane forming components, it will be understood that the air provided through the air knife 19 must not provide enough heat to cause the reaction. To assure that the air from the air knife 19 is at a low enough temperature, the air provided to the air knife is cooled by the cooling unit 25. The cooling unit 25 is connected to a second heat exchanger 29 by means of lines 30. A pump 31 collects ambient air through the intake 32, and raises the air to the desired pressure for the air knife. The compressed air is then passed through the heat exchanger 29, and from the heat exchanger 29 to the air knife 19.

It will now be understood that the sheet material 12 has been uniformly coated with polyurethane components, and the components are at a sufficiently low temperature that they will not react. The sheet material 12 is then passed over the roller 20 to be attached to the second sheet material.

A supply of the second sheet material may be provided by any conventional means. If a relatively thin woven or nonwoven fabric is utilized, a roll of the material can be supported adjacent to the apparatus. For tufted carpeting or the like, it is conventional to feed the material from a J-box. These arrangements are well known to those skilled in the art and no further description is thought to be necessary.

As the immediate input to the tenter 10, there is a tensioning arrangement indicated at 34. This arrangement is also well known in the art, and includes a weighted dancer roll 35. The purpose of this arrangement is to provide sufficient tension on the incoming sheet material designated at 36 to prevent any wrinkling of the material. The sheet material 36 engages the tenter frame 10, and is pressed against pins on the tenter frame by the conventional press wheel 38. Once the sheet material 36 is firmly engaged with the pins on the tenter 10, it will be understood that the sheet material is held taut and unwrinkled.

Shortly after the sheet material 36 is attached to the tenter 10, the sheet material 12, passing over the roller 20, is married with the sheet material 36. It should be understood that the sheet material 12 is fed through its path at precisely the same linear speed as the linear speed of the tenter frame 10. When the sheet material 12 is married with the sheet material 36, the two sheets are placed together, but the two sheets are not squeezed. The sheet material 12 is held taut as it passes through the previously described path and over the roller 20. When the sheet material 12 passes over the roller 20, the sheet material 12 is pressed against the pins on the tenter 10 by the press roller 39. Thus, the two sheets 12 and 36 are held by the tenter frame 10, sandwiching the polyurethane components therebetween.

As the tenter frame 10 moves the sandwich of material to the left as viewed in FIG. 1, the material passes over a steam box designated at 40. A vent hood 41 is disposed above the steam box 40, the vent hood 41 having a vent pipe 42. The vent hood 41 collects steam and other vapors to remove them from the working environment of the machine.

The steam box 40 is fed with steam at a generally constant pressure throughout the period of operation of the device. Thus, as the material carried by the tenter frame 10 passes over the steam box 40, steam is passed through the perforate sheet material 36 and into the polyurethane components. As is disclosed in the co-pending application, the steam both adds water to the polyurethane formulation and provides sufficient heat energy to initiate the reaction of the components. An excess of isocyanate is included in the formulation such that the steam completes the proper water component. Thus, at the steam box 40 the polyurethane components react to create a foamed polyurethane.

Polyethylene is a thermoplastic, and many such films will tend to expand when the material is heated by the steam box 40. While the process will still operate to provide a useable product, the film will subsequently shrink and cause wrinkles in the surface. To prevent such wrinkles, it has been found that a heat-shrinkable polyethylene can be used. The first sheet 12 then tightens at the steam box 40, and the surface of the polyurethane remains smooth. Though many appropriate films may be determined by those skilled in the art, it has been found that a film manufactured by Dow Chemical Company and designated as DAF 709 yields good results, using a 1 mil thick film.

Once the reaction is initiated, the polyurethane will complete the blowing and cure in a relatively short time. After the blowing is substantially complete, but before the foam has cured beyond its plastic state, the thickness of the material is pressed down by a roller 44. Since the sheet material 12 is on top of the polyurethane, it will be understood that the polyurethane cannot stick to the roller 44 so no additional detackifying means is required. In addition, as here shown there is a pin roller 45. Though the pin roller 45 is optional, it may be used to provide a plurality of indentations in the surface of the polyurethane to provide a pleasing pattern.

After the thickness of the foamed polyurethane has been adjusted, the fabric can be considered to be in a useable state; however, to improve the appearance and to assure that the sheet material 12 will not separate from the polyurethane foam, heating means 46 may be used. In one successful embodiment, the heating means 46 comprises an infrared heater to heat the sheet material 12. Since the sheet material 12 is a polyethylene, the heating means 46 will melt the polyethylene and cause an intimate bonding with the polyurethane foam.

The final steps shown in FIG. 1 of the drawings include edge trimming by means of a rotary knife 48. This is conventional in the coating of carpeting and will be well understood by those skilled in the art without further discussion. Following the edge trimming by the knife 48, the completed material is conveyed around rollers 49 and 50, and down to a roll-up station 51.

FIG. 2 of the drawings shows in more detail the point at which the coated sheet material 12 is married to the sheet material 36. It will be understood that thicknesses of the sheet material 12 and the coating of polyurethane components designated at 52 are exaggerated in thickness for a better showing.

The sheet material 36 is here shown as carpeting including a backing 54 having face yarns 55 tufted thereinto, and having the back switch 56. It will be understood that one purpose of the coating of the carpet 36 is to lock the face yarns 55 into the backing 54 by encapsulating the back stitch 56. As a result, it is very important that the back stitch 56 be completely surrounded by the polyurethane.

With the above in mind, it will be seen that the sheet material 12 with the coating 52 passes over the roll 20 and engages the sheet material 36. Since the coating 52 is in a liquid state, it will be understood that the material will flow around the back stitch 56 and against the carpet backing 54. It should also be understood, however, that the coating 52 on the sheet material 12 is very thin and cohesive, and is held by adhesion to the sheet material 12. As a result of these factors, the polyurethane components will not flow through the carpet backing 54, even without using thickening agents or the like.

After the sheet material 12 is married with the sheet material 36, the edges of the sheet material 12 are pressed down by the presser roller 39. The first sheet 12 and the second sheet 36 are therefore held together only by being placed on the tenter frame 10.

Looking now at FIGS. 3 and 4 of the drawings, it will be seen that the sheet material 36 has the coating 52 applied to the back, with the sheet material 12 above the coating. In this condition, the entire sandwich of material is carried over the steam box 40. The steam box 40 is divided into a plurality of chambers, here designated at 40A, 40B and 40C. The purpose of the separate compartments is to provide a substantially uniform pressure throughout the width of the material. On an installation designed to handle 12 foot wide carpeting, it has been found that the three separate chambers is sufficient, though of course any number of chambers may be utilized depending on the width involved, and the number of separate controls required.

It will be seen that each of the chambers 40A, 40B and 40C has an inlet pipe 58A, 58B and 58C controlled by valves 59A, 59B and 59C. Thus, the separate compartments of the steam box 40 can be controlled by the individual valves to achieve substantially uniform pressure throughout the width of the steam box 40. A single steam supply line 60 will be connected to a source of steam under pressure. It will be understood that steam at substantially 212° F. is sufficient to activate the reaction of the polyurethane components, so there is no intentional superheating of the steam. In order to provide the pressure to force the steam through the carpeting or other sheet material 36 and into the polyurethane forming components, the steam is supplied at a pressure of around 60 to 80 psig. Thus, the steam must necessarily be at a slightly increased temperature, but this is simply a necessary side effect of providing the desired pressure rather than an intent to superheat the steam.

Almost immediately when the material is subjected to steam from the steam box 40, the reaction of the polyurethane forming components begins. As is indicated by the somewhat undulating portion 61, the material first takes on a rough, somewhat bubbly appearance with the sheet material 12 thereover. As the polyurethane continues to blow, the material becomes uniform and substantially level as indicated at 62. It should be understood that the sheet material 12 may be polyethylene of approximately 1 mil in thickness. As a result, the sheet material 12 is so light as to provide almost no hindrance to the expansion of the foam, and a full blowing of the polyurethane is achieved.

Only after the polyurethane has substantially completed blowing, the material will be pressed down to the desired thickness. For this purpose the roller 44 is provided, the roller 44 being set to a predetermined height so that the material after the roller 44 will have the desired thickness.

Though it is optional in use, it has been found that the use of the pin roll 45 will provide a pleasing, textured surface for the polyurethane coating. Obviously many forms of rollers may be used, but a conventional pin roller as is well known in textile manufacturing has been utilized to provide a regular pattern on the surface of the polyurethane.

It will therefore be seen that the present invention provides an improved polyurethane coating method and apparatus, the polyurethane forming components being always dispensed onto a first sheet material and leveled into a uniform coating. Only after the material is formed into a uniform coating is the material inverted and placed against a second sheet material. A sandwich is formed of the two sheet materials with the polyurethane forming components therebetween; then, steam is passed through the second sheet material and into the polyurethane forming components to provide sufficient heat to cause the reaction and start the blowing of the polyurethane, also adding additional water to the polyurethane formulation. The use of the very light weight first sheet material allows complete blowing of the polyurethane, and also provides a ready surface that is not tacky so the polyurethane can be pressed down into a final, desired thickness. Because of the simplicity and versatility of the system of the present invention, the second sheet material may be an inexpensive woven or nonwoven material for providing carpet padding, or the sheet material may be a tufted carpet. In the event the second sheet material is tufted carpet, the liquid polyurethane components will sufficiently wet the back stitch of the carpet so that excellent bonding of the face yarns is achieved.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

We claim:

1. A method for providing a cushion of foamed polyurethane having a fabric on at least one side of said cushion, said method including the step of coating one side of a first sheet with components for forming a foamed polyurethane, said components being such as to begin reaction on being heated by passing steam through said components so that said steam both heats said components and adds water for reaction with said components, inverting said first sheet and placing said coated one side of said first sheet down against a second sheet that is below the first sheet for forming a sandwich of said polyurethane forming components between the sheets, said second sheet comprising a fabric pervious to steam, moving said sandwich across a steam box and continuously steaming said sandwich for adding water, heating said components and initiating the reaction of said polyurethane forming components, and allowing complete reaction of said components with said first sheet on the upper surface.

2. A method as claimed in claim 1, wherein the said step of coating one side of a first sheet comprises the steps of cooling said components for forming a polyurethane, dispensing said components onto said first sheet while said first sheet is moving in an inclined path, and leveling the resulting puddle for forming said coating.

3. A method as claimed in claim 2, characterized in that the step of leveling the resulting puddle is carried out by pumping air at a predetermined pressure, cooling said air, and delivering the cooled air to an air knife leveling the puddle.

4. A method as claimed in claim 3, and further including the step of heating said first sheet, following the step of allowing complete reaction of said components, sufficiently to weld said first sheet to said resulting foam.

5. A method as claimed in claim 4, said first sheet consisting of a thermoplastic film.

6. A method as claimed in claim 5, said first sheet consisting of a heat-shrink film.

7. A method as claimed in claim 6, said first sheet consisting of a polyethylene film having a thickness of approximately one mil.

8. A method as claimed in claim 1, and further including the steps of pinning said second sheet to a tenter and moving said tenter to carry said second sheet while carrying said first sheet over a roll adjacent to said tenter for carrying out the said steps of inverting said first sheet and placing said coated one side of said first sheet against a second sheet, and moving said first sheet and said second sheet at the same linear speed.

9. A method as claimed in claim 8, and further including the step of urging said first sheet onto the pins of said tenter for carrying out the step of moving said sandwich across a steam box.

10. A method as claimed in claim 9, said second sheet consisting of tufted carpeting.

11. A method as claimed in claim 1, and further including the step of compressing the resulting foam after blowing is completed and before curing of the polyurethane foam beyond its plastic state.

12. A method as claimed in claim 11, wherein said step of compressing said foam includes the steps of indenting the surface of said foam to provide a pattern.

13. A method as claimed in claim 12, said step of compressing said foam further including the step of reducing the thickness of said foam subsequent to the step of indenting the surface of said foam.

* * * * *